United States Patent
Hendry

(10) Patent No.: US 12,483,729 B2
(45) Date of Patent: Nov. 25, 2025

(54) IMAGE ENCODING/DECODING METHOD AND APPARATUS FOR SIGNALING PICTURE OUTPUT TIMING INFORMATION, AND COMPUTER-READABLE RECORDING MEDIUM STORING BITSTREAM

(71) Applicant: LG Electronics Inc., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 18/011,054

(22) PCT Filed: Jun. 16, 2021

(86) PCT No.: PCT/KR2021/007564
§ 371 (c)(1),
(2) Date: Dec. 16, 2022

(87) PCT Pub. No.: WO2021/256857
PCT Pub. Date: Dec. 23, 2021

(65) Prior Publication Data
US 2023/0308689 A1    Sep. 28, 2023

Related U.S. Application Data

(60) Provisional application No. 63/045,180, filed on Jun. 28, 2020, provisional application No. 63/040,530, filed on Jun. 18, 2020.

(51) Int. Cl.
*H04N 19/70* (2014.01)
*H04N 19/105* (2014.01)
(Continued)

(52) U.S. Cl.
CPC ........... *H04N 19/70* (2014.11); *H04N 19/105* (2014.11); *H04N 19/136* (2014.11);
(Continued)

(58) Field of Classification Search
CPC .. H04N 19/105; H04N 19/136; H04N 19/137; H04N 19/172; H04N 19/184;
(Continued)

(56) References Cited

FOREIGN PATENT DOCUMENTS

| CN | 104396255 A | 3/2015 |
|---|---|---|
| CN | 106464917 A | 2/2017 |

(Continued)

OTHER PUBLICATIONS

Bross et al. ("Versatile Video Coding (Draft 10)", Joint Video Experts Team (JVET) of ITU-T SG 16 WP 3 and ISO/IEC JTC 1/SC 29/WG 11; 19th Meeting: by teleconference, Jun. 22-Jul. 1, 2020; Document: JVET-S2001-v7) (Year: 2020).*

(Continued)

*Primary Examiner* — Maria E Vazquez Colon
(74) *Attorney, Agent, or Firm* — Bryan Cave Leighton Paisner LLP

(57) ABSTRACT

An image encoding/decoding method and apparatus are provided. An image decoding method according to the present disclosure may comprise obtaining a first flag specifying whether a network abstraction layer (NAL) hypothetical reference decoder (HRD) parameter is present in a bitstream and a second flag specifying whether a video coding layer (VCL) HRD parameter is present in the bitstream, obtaining a third flag specifying whether a temporal distance between output times of consecutive pictures in the bitstream has a fixed value, deriving output times of the pictures in the bitstream, based on at least one of the first flag, the second flag or the third flag, and processing the pictures in the bitstream based on the derived output times. Based on the first flag having a second value specifying that the NAL HRD parameter is not present in the bitstream and the second flag having a second value specifying that the VCL HRD parameter is not present in the bitstream, it may
(Continued)

be constrained that the third flag has a first value specifying that the temporal distance between the output times of the consecutive pictures in the bitstream has a fixed value.

11 Claims, 14 Drawing Sheets

(51) Int. Cl.
  *H04N 19/136* (2014.01)
  *H04N 19/169* (2014.01)
  *H04N 19/172* (2014.01)
  *H04N 19/187* (2014.01)

(52) U.S. Cl.
  CPC ......... *H04N 19/172* (2014.11); *H04N 19/187* (2014.11); *H04N 19/188* (2014.11)

(58) Field of Classification Search
  CPC .... H04N 19/187; H04N 19/188; H04N 19/30; H04N 19/31; H04N 19/423; H04N 19/44; H04N 19/70; H04N 19/82
  See application file for complete search history.

(56) References Cited

FOREIGN PATENT DOCUMENTS

| | | |
|---|---|---|
| KR | 101464011 B | 11/2014 |
| KR | 101651769 B | 8/2016 |
| KR | 1020170021781 A | 2/2017 |
| WO | 2015195761 A1 | 12/2015 |
| WO | 2017195582 A1 | 11/2017 |

OTHER PUBLICATIONS

Bross et al. ("Versatile Video Coding (Draft 9)", Joint Video Experts Team (JVET) of ITU-T SG 16 WP 3 and ISO/IEC JTC 1/SC 29/WG 11; 18th Meeting: by teleconference, Apr. 15-24, 2020; Document: JVET-R2001) (Year: 2020).*

Sanchez et al. ("AHG9: Cleanup of picture rate information and HRD operation without timing SEI messages—version 1", Joint Video Experts Team (JVET) of ITU-T SG 16 WP 3 and ISO/IEC JTC 1/SC 29/WG 11; 19th Meeting: by teleconference, Jun. 10, 2020; Document: JVET-S0175) (Year: 2020).*

Benjamin Bross, et al., "Versatile Video Coding (Draft 9)", Joint Video Experts Team (JVET) of ITU-T SG 16 WP 3 and ISO/IEC JTC 1/SC 29/WG 11, 18th Meeting: by teleconference, Apr. 15-24, 2020. JVET-R2001-vA.

Yago Sanchez, et al., "AHG9: Cleanup of picture rate information and HRD operation without timing SEI messages", Joint Video Experts Team (JVET) of ITU-T SG 16 WP 3 and ISO/IEC JTC 1/SC 29/WG 11, 19th Meeting: by teleconference, Jun. 22-Jul. 1, 2020. JVET-S0175.

* cited by examiner

FIG. 7

| video_parameter_set_rbsp( ) { | Descriptor |
|---|---|
| ... | |
|   vps_general_hrd_params_present_flag | u(1) |
|   if( vps_general_hrd_params_present_flag ) { | |
|     general_hrd_parameters( ) | |
|     if( vps_max_sublayers_minus1 > 0 ) | |
|       vps_sublayer_cpb_params_present_flag | u(1) |
|     vps_num_ols_hrd_params_minus1 | ue(v) |
|     for( i = 0; i <= vps_num_ols_hrd_params_minus1; i++ ) { | |
|       if( !vps_default_ptl_dpb_hrd_max_tid_flag ) | |
|         vps_hrd_max_tid[ i ] | u(3) |
|       firstSubLayer = vps_sublayer_cpb_params_present_flag ? 0 : vps_hrd_max_tid[ i ] | |
|       ols_hrd_parameters( firstSubLayer, vps_hrd_max_tid[ i ] ) | |
|     } | |
|     if( vps_num_ols_hrd_params_minus1 > 0 &&<br>      vps_num_ols_hrd_params_minus1 + 1 != NumMultiLayerOlss ) | |
|       for( i = 0; i < NumMultiLayerOlss; i++ ) | |
|         vps_ols_hrd_idx[ i ] | ue(v) |
|   } | |
|   } | |
|   ... | |
| } | |

FIG. 8

| seq_parameter_set_rbsp( ) { | Descriptor |
|---|---|
| ... | |
|    sps_ptl_dpb_hrd_params_present_flag | u(1) |
| ... | |
| ... | |
|   if( sps_ptl_dpb_hrd_params_present_flag ) { | |
|     sps_general_hrd_params_present_flag | u(1) |
|     if( sps_general_hrd_params_present_flag ) { | |
|       general_hrd_parameters( ) | |
|       if( sps_max_sublayers_minus1 > 0 ) | |
|         sps_sublayer_cpb_params_present_flag | u(1) |
|       firstSubLayer = sps_sublayer_cpb_params_present_flag ? 0 : sps_max_sublayers_minus1 | |
|       ols_hrd_parameters( firstSubLayer, sps_max_sublayers_minus1 )<br>    } | |
|   } | |
| ... | |
| } | |

FIG. 9

| general_hrd_parameters( ) { | Descriptor |
|---|---|
|   num_units_in_tick | u(32) |
|   time_scale | u(32) |
|   general_nal_hrd_params_present_flag | u(1) |
|   general_vcl_hrd_params_present_flag | u(1) |
|   general_same_pic_timing_in_all_ols_flag | u(1) |
|   general_decoding_unit_hrd_params_present_flag | u(1) |
|   if( general_decoding_unit_hrd_params_present_flag ) | |
|     tick_divisor_minus2 | u(8) |
|   bit_rate_scale | u(4) |
|   cpb_size_scale | u(4) |
|   if( general_decoding_unit_hrd_params_present_flag ) | |
|     cpb_size_du_scale | u(4) |
|   hrd_cpb_cnt_minus1 | ue(v) |
| } | |

FIG. 10

| ols_hrd_parameters( firstSubLayer, maxSubLayers ) { | Descriptor |
|---|---|
|   for( i = firstSubLayer; i <= maxSubLayers; i++ ) { | |
|     fixed_pic_rate_general_flag[ i ] | u(1) |
|     if( !fixed_pic_rate_general_flag[ i ] ) | |
|       fixed_pic_rate_within_cvs_flag[ i ] | u(1) |
|     if( fixed_pic_rate_within_cvs_flag[ i ] ) | |
|       elemental_duration_in_tc_minus1[ i ] | ue(v) |
|     else if( hrd_cpb_cnt_minus1 == 0 ) | |
|       low_delay_hrd_flag[ i ] | u(1) |
|     if( general_nal_hrd_params_present_flag ) | |
|       sublayer_hrd_parameters( i ) | |
|     if( general_vcl_hrd_params_present_flag ) | |
|       sublayer_hrd_parameters( i ) | |
|   } | |
| } | |

FIG. 11

| sublayer_hrd_parameters( subLayerId ) { | Descriptor |
|---|---|
|   for( j = 0; j <= hrd_cpb_cnt_minus1; j++ ) { | |
|     bit_rate_value_minus1[ subLayerId ][ j ] | ue(v) |
|     cpb_size_value_minus1[ subLayerId ][ j ] | ue(v) |
|     if( general_decoding_unit_hrd_params_present_flag ) { | |
|       cpb_size_du_value_minus1[ subLayerId ][ j ] | ue(v) |
|       bit_rate_du_value_minus1[ subLayerId ][ j ] | ue(v) |
|     } | |
|     cbr_flag[ subLayerId ][ j ] | u(1) |
|   } | |
| } | |

FIG. 12

| general_hrd_parameters( ) { | Descriptor |
|---|---|
|   num_units_in_tick | u(32) |
|   time_scale | u(32) |
|   general_nal_hrd_params_present_flag | u(1) |
|   general_vcl_hrd_params_present_flag | u(1) |
|   if( general_nal_hrd_params_present_flag \|\| general_vcl_hrd_params_present_flag ) { | |
|     general_same_pic_timing_in_all_ols_flag | u(1) |
|     general_decoding_unit_hrd_params_present_flag | u(1) |
|     if( general_decoding_unit_hrd_params_present_flag ) | |
|       tick_divisor_minus2 | u(8) |
|     bit_rate_scale | u(4) |
|     cpb_size_scale | u(4) |
|     if( general_decoding_unit_hrd_params_present_flag ) | |
|       cpb_size_du_scale | u(4) |
|     hrd_cpb_cnt_minus1 | ue(v) |
|   } else { | |
|     poc_proportional_to_timing_flag | u(1) |
|     if( poc_proportional_to_timing_flag ) | |
|       num_ticks_poc_diff_one_minus1 | ue(v) |
|   } | |
| } | |

FIG. 13

| | |
|---|---|
| vps_general_hrd_params_present_flag | u(1) |
| if( vps_general_hrd_params_present_flag ) { | |
|     general_hrd_parameters( ) | |
|     if( general_nal_hrd_params_present_flag \|\| general_vcl_hrd_params_present_flag ) { | |
|         if( vps_max_sublayers_minus1 > 0 ) | |
|             vps_sublayer_cpb_params_present_flag | u(1) |
|         ... | |
|     } | |
| } | |

| | |
|---|---|
| sps_general_hrd_params_present_flag | u(1) |
| if( sps_general_hrd_params_present_flag ) { | |
|     general_hrd_parameters( ) | |
|     if( general_nal_hrd_params_present_flag \|\| general_vcl_hrd_params_present_flag ) { | |
|         if( sps_max_sublayers_minus1 > 0 ) | |
|             sps_sublayer_cpb_params_present_flag | u(1) |
|         firstSubLayer = sps_sublayer_cpb_params_present_flag ? 0 :<br>            sps_max_sublayers_minus1 | |
|         ols_hrd_parameters( firstSubLayer, sps_max_sublayers_minus1 ) | |
|     } | |
| } | |

FIG. 14

| general_hrd_parameters( ) { | Descriptor |
|---|---|
|     num_units_in_tick | u(32) |
|     time_scale | u(32) |
|     poc_proportional_to_timing_flag | u(1) |
|     if( poc_proportional_to_timing_flag ) | |
|         num_ticks_poc_diff_one_minus1 | ue(v) |
|     general_nal_hrd_params_present_flag | u(1) |
|     general_vcl_hrd_params_present_flag | u(1) |
|     if( general_nal_hrd_params_present_flag \|\| general_vcl_hrd_params_present_flag ) { | |
|         general_same_pic_timing_in_all_ols_flag | u(1) |
|         general_decoding_unit_hrd_params_present_flag | u(1) |
|         if( general_decoding_unit_hrd_params_present_flag ) | |
|             tick_divisor_minus2 | u(8) |
|         bit_rate_scale | u(4) |
|         cpb_size_scale | u(4) |
|         if( general_decoding_unit_hrd_params_present_flag ) | |
|             cpb_size_du_scale | u(4) |
|         hrd_cpb_cnt_minus1 | ue(v) |
|     } | |
| } | |

FIG. 15

| | |
|---|---|
| vps_general_hrd_params_present_flag | u(1) |
| if( vps_general_hrd_params_present_flag ) { | |
|   general_hrd_parameters( ) | |
|   if( !poc_proportional_to_timing_flag ) { | |
|     if( vps_max_sublayers_minus1 > 0 ) | |
|       vps_sublayer_cpb_params_present_flag | u(1) |
|     ... | |
|   } | |
| } | |

| | |
|---|---|
| sps_general_hrd_params_present_flag | u(1) |
| if( sps_general_hrd_params_present_flag ) { | |
|   general_hrd_parameters( ) | |
|   if(!poc_proportional_to_timing_flag ) { | |
|     if( sps_max_sublayers_minus1 > 0 ) | |
|       sps_sublayer_cpb_params_present_flag | u(1) |
|     firstSubLayer = sps_sublayer_cpb_params_present_flag ? 0 : sps_max_sublayers_minus1 | |
|     ols_hrd_parameters( firstSubLayer, sps_max_sublayers_minus1 ) | |
|   } | |
| } | |

FIG. 16

| | Descriptor |
|---|---|
| ols_hrd_parameters( firstSubLayer, maxSubLayers ) { | |
|   for( i = firstSubLayer; i <= maxSubLayers; i++ ) { | |
|     fixed_pic_rate_general_flag[ i ] | u(1) |
|     if( !fixed_pic_rate_general_flag[ i ] ) | |
|       fixed_pic_rate_within_cvs_flag[ i ] | u(1) |
|     if( fixed_pic_rate_within_cvs_flag[ i ] ) | |
|       elemental_duration_in_tc_minus1[ i ] | ue(v) |
|     else if( hrd_cpb_cnt_minus1 == 0 && ( general_nal_hrd_params_present_flag \|\| general_vcl_hrd_params_present_flag ) ) | |
|       low_delay_hrd_flag[ i ] | u(1) |
|     if( general_nal_hrd_params_present_flag ) | |
|       sublayer_hrd_parameters( i ) | |
|     if( general_vcl_hrd_params_present_flag ) | |
|       sublayer_hrd_parameters( i ) | |
|   } | |
| } | | if( !( general_nal_hrd_params_present_flag && general_vcl_hrd_params_present_flag ) )
    DpbOutputElementalInterval[ n ] = ClockTick * ( elemental_duration_in_tc_minus1[ i ] + 1 )
else
    DpbOutputElementalInterval[ n ] = DpbOutputInterval[ n ] ÷
           pt_display_elemental_periods_minus1 + 1 )

IMAGE ENCODING/DECODING METHOD AND APPARATUS FOR SIGNALING PICTURE OUTPUT TIMING INFORMATION, AND COMPUTER-READABLE RECORDING MEDIUM STORING BITSTREAM

CROSS-REFERENCE TO RELATED APPLICATION

This application is the National Stage filing under 35 U.S.C. 371 of International Application No. PCT/KR2021/007564, filed Jun. 16, 2021, which claims the benefit of U.S. Provisional Application No. 63/045,180, filed on Jun. 28, 2020, U.S. Provisional Application No. 63/040,530, filed on Jun. 18, 2020, the contents of which are all hereby incorporated by reference herein in their entirety.

TECHNICAL FIELD

The present disclosure relates to an image encoding/decoding method and apparatus, and more particularly, to an image encoding/decoding method and apparatus for performing improved signaling of picture output timing information and a method for transmitting a bitstream generated by the image encoding method/apparatus of the present disclosure.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

Another object of the present disclosure is to provide an image encoding/decoding method and apparatus for performing improved signaling of picture output timing information.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure. For example, a bitstream for enabling the image decoding apparatus according to the present disclosure to perform the image decoding method according to the present disclosure may be stored in the recording medium.

The technical problems solved by the present disclosure are not limited to the above technical problems and other technical problems which are not described herein will become apparent to those skilled in the art from the following description.

An image decoding method performed by an image decoding apparatus according to an aspect of the present disclosure may comprise obtaining a first flag specifying whether a network abstraction layer (NAL) hypothetical reference decoder (HRD) parameter is present in a bitstream and a second flag specifying whether a video coding layer (VCL) HRD parameter is present in the bitstream; obtaining a third flag specifying whether a temporal distance between output times of consecutive pictures in the bitstream has a fixed value, deriving output times of the pictures in the bitstream, based on at least one of the first flag, the second flag or the third flag, and processing the pictures in the bitstream based on the derived output times. Based on the first flag having a second value specifying that the NAL HRD parameter is not present in the bitstream and the second flag having a second value specifying that the VCL HRD parameter is not present in the bitstream, it may be constrained that the third flag has a first value specifying that the temporal distance between the output times of the consecutive pictures in the bitstream has a fixed value.

In the image decoding method of the present disclosure, the third flag may be obtained for each of temporal sublayers in the bitstream, and, based on the first flag having the second value and the second flag having the second value, it may be constrained that the third flag for at least one of the temporal sublayers in the bitstream has the first value.

In the image decoding method of the present disclosure, the third flags may be obtained by a maximum number of temporal sublayers in the bitstream, and, based on the first flag having the second value and the second flag having the second value, at least one of the obtained third flags has the first value.

In the image decoding method of the present disclosure, the first flag and the second flag may be obtained from a general HRD parameter syntax structure in the bitstream, and the third flag is obtained from an HRD parameter syntax structure for an output layer set.

In the image decoding method of the present disclosure, a maximum number of temporal sublayers may be differently determined based on a parameter set from which an HRD parameter syntax structure for the output layer set is obtained.

An image decoding apparatus according to another aspect of the present disclosure may comprise a memory and at least one processor. The at least processor may obtain a first flag specifying whether a network abstraction layer (NAL) hypothetical reference decoder (HRD) parameter is present in a bitstream and a second flag specifying whether a video coding layer (VCL) HRD parameter is present in the bitstream, obtain a third flag specifying whether a temporal distance between output times of consecutive pictures in the bitstream has a fixed value, derive output times of the pictures in the bitstream, based on at least one of the first flag, the second flag or the third flag, and process the pictures in the bitstream based on the derived output times. Based on the first flag having a second value specifying that the NAL HRD parameter is not present in the bitstream and the second flag having a second value specifying that the VCL HRD parameter is not present in the bitstream, it may be constrained that the third flag has a first value specifying that the temporal distance between the output times of the consecutive pictures in the bitstream has a fixed value.

An image encoding method performed by an image encoding apparatus according to another aspect of the present disclosure may comprise determining a first flag specifying whether a network abstraction layer (NAL) hypothetical reference decoder (HRD) parameter is present in a bitstream and a second flag specifying whether a video coding layer (VCL) HRD parameter is present in the bitstream, determining a third flag specifying whether a temporal distance between output times of consecutive pictures in the bitstream has a fixed value, deriving output times of the pictures in the bitstream, based on at least one of the first flag, the second flag or the third flag, and processing the pictures in the bitstream based on the derived output times. Based on the first flag having a second value specifying that the NAL HRD parameter is not present in the bitstream and the second flag having a second value specifying that the VCL HRD parameter is not present in the bitstream, it may be constrained that the third flag has a first value specifying that the temporal distance between the output times of the consecutive pictures in the bitstream has a fixed value.

In the image encoding method of the present disclosure, the third flag may be determined for each of temporal sublayers in the bitstream, and, based on the first flag having the second value and the second flag having the second value, it may be constrained that the third flag for at least one of the temporal sublayers in the bitstream has the first value.

In the image encoding method of the present disclosure, the third flags may be determined by a maximum number of temporal sublayers in the bitstream, and, based on the first flag having the second value and the second flag having the second value, at least one of the determined third flags may have the first value.

In the image encoding method of the present disclosure, the first flag and the second flag may be encoded in a general HRD parameter syntax structure in the bitstream, and the third flag may be encoded in an HRD parameter syntax structure for an output layer set.

In the image encoding method of the present disclosure, a maximum number of temporal sublayers may be differently determined based on a parameter set in which an HRD parameter syntax structure for the output layer set is encoded.

Also, a transmission method according to another aspect of the present disclosure may transmit a bitstream generated by an image encoding apparatus or method according to the present disclosure.

Also, a computer-readable recording medium according to another aspect of the present disclosure may store a bitstream generated by an image encoding method or apparatus according to the present disclosure.

Also, a computer-readable recording medium according to another aspect of the present disclosure may store a bitstream for enabling a decoding apparatus to perform the image decoding method according to the present disclosure.

A non-transitory computer-readable recording medium according to another aspect of the present disclosure may store a bitstream generated by an image decoding method and used to reconstruct an image. The bitstream may comprise a first flag specifying whether a network abstraction layer (NAL) hypothetical reference decoder (HRD) parameter is present in a bitstream, a second flag specifying whether a video coding layer (VCL) HRD parameter is present in the bitstream, and a third flag specifying whether a temporal distance between output times of consecutive pictures in the bitstream has a fixed value, at least one of the first flag, the second flag or the third flag may be used to derive output times of pictures in the bitstream, and the derived output times may be used to process the pictures in the bitstream, and, based on the first flag having a second value specifying that the NAL HRD parameter is not present in the bitstream and the second flag having a second value specifying that the VCL HRD parameter is not present in the bitstream, it may be constrained that the third flag has a first value specifying that the temporal distance between the output times of the consecutive pictures in the bitstream has a fixed value.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

According to the present disclosure, it is possible to provide an image encoding/decoding method and apparatus for performing improved signaling of picture output timing information.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 7 is a view exemplarily illustrating an HRD structure signaled in VPS.

FIG. 8 is a view exemplarily illustrating an HRD structure signaled in the SPS.

FIG. 9 is a view exemplarily illustrating a general_hrd_parameterso syntax structure.

FIG. 10 is a view exemplarily illustrating an ols_hrd_parameters( ) syntax structure.

FIG. 11 is a view exemplarily illustrating a sublayer_hrd_parameters( ) syntax structure.

FIG. 12 is a view exemplarily illustrating general_hrd_parameterso syntax structure according to an embodiment of the present disclosure.

FIG. 13 is a view exemplarily illustrating a modification of a syntax structure of the VPS and the SPS according to the embodiment of FIG. 12.

FIG. 14 is a view exemplarily illustrating a general_hrd_parameterso syntax structure according to another embodiment of the present disclosure.

FIG. 15 is a view exemplarily illustrating a modification of a syntax structure of a VPS and an SPS according to the embodiment of FIG. 14.

FIG. 16 is a view exemplarily illustrating an ols_hrd_parameterso syntax structure according to another embodiment of the present disclosure.

DETAILED DESCRIPTION

Figure 1:
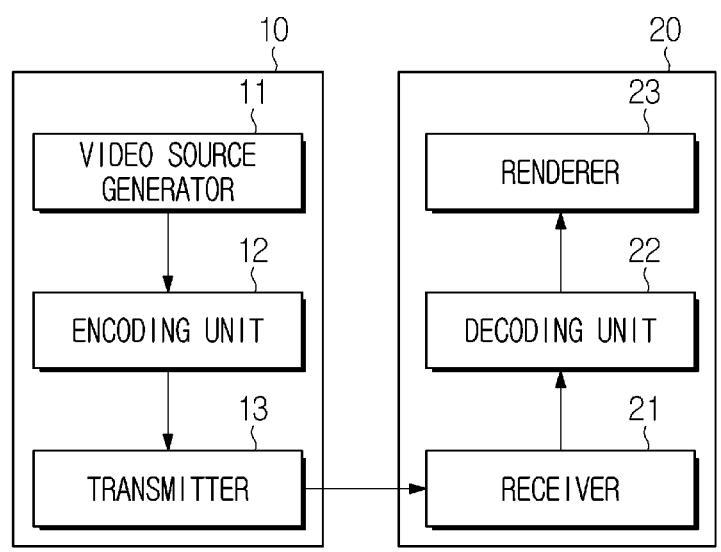
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

Method/embodiments disclosed in the present disclosure are applicable to methods disclosed in the versatile video coding (VVC) standard. In addition, method/embodiments disclosed in the present disclosure are applicable to methods disclosed in the essential video coding (EVC) standard, the AOMedia Video 1 (AV1) standard, the 2nd generation of audio video coding standard (AVS2) or the next-generation video/image coding standard (e.g., 0.267 or H.268).

In the present disclosure, various embodiments of video/image coding are provided and embodiments of the present disclosure, which are not described, may be performed in combination.

In the present disclosure, a "video" may mean a set of images over time. A "picture" generally refers to a unit representing one image at a specific time, and a slice/tile is a coding unit constituting a portion of a picture in coding. A slice/tile may include one or more coding tree units (CTUs). The CTU may be partitioned into one or more CUs.

One picture may consist of one or more slices/tiles. A tile is a rectangular area within a particular tile row and a particular tile column in a picture and may consist of a plurality of CTUs. The tile column may be defined as a rectangular area of CTUs and may have a height equal to the height of the picture and a width specified by a syntax element signalled from a bitstream portion such as a picture parameter set. The tile row may be defined as a rectangular area of CTUs and may have a width equal to the width of the picture and a height specified by a syntax element signalled from a bitstream portion such as a picture parameter set.

A tile scan is a specific sequential ordering of CTUs partitioning a picture. Here, the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture. The slice may be exclusively contained in a single NAL unit.

One picture may be partitioned into two or more subpictures. The subpicture may be a rectangular region of one or more slices in the picture.

One picture may include one or more tile groups. One tile group may include one or more tiles. A brick may represent a rectangular region of CTU rows within a tile in a picture. One tile may include one or more bricks. The brick may represent a rectangular region of CTU rows in a tile. One tile may be partitioned into a plurality of bricks and each brick may include one or more CTU rows belonging to a tile. A tile which is not partitioned into a plurality of bricks may also be treated as a brick.

A "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma blocks (e.g., Cb and Cr). The unit may be used interchangeably with the terms such as "sample array", "block" or "area" in some cases. In a general case, an M×N block may include a set (or array) of samples (or a sample array) or transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

In the present disclosure, "at least one of A and B" may mean "only A", "only B" or "both A and B". In addition, in the disclosure, "at least one of A or B" or "at least one of A and/or B" may be interpreted as being the same as "at least one of A and B".

In addition, in the present disclosure, "at least one of A, B and C" may mean "only A", "only B", "only C" or "any combination of A, B and C". In addition, in the disclosure, "at least one of A, B or C" or "at least one of A, B and/or C" may be interpreted as being the same as "at least one of A, B and C".

In addition, parentheses used in the present disclosure may mean "for example". Specifically, when "prediction (intra prediction)" is described, "intra prediction" may be proposed as an example of "prediction". In other words, "prediction" of the present disclosure is not limited to "intra prediction" and "intra prediction" may be proposed as an example of "prediction". In addition, even when "prediction (that is, intra prediction)" is described, "intra prediction" may be proposed as an example of "prediction".

In the present disclosure, technical features individually described in one drawing may be implemented individually or simultaneously.

Overview of Video Coding System

FIG. 1 is a view showing a video coding system according to the present disclosure.

The video coding system according to an embodiment may include a source device 10 and a reception device 20. The source device 10 may deliver encoded video and/or image information or data to the reception device 20 in the form of a file or streaming via a digital storage medium or network.

The source device 10 according to an embodiment may include a video source generator 11, an encoding device 12 and a transmitter 13. The reception device 20 according to an embodiment may include a receiver 21, a decoding device 22 and a renderer 23. The encoding device 12 may be called a video/image encoding device, and the decoding device 22 may be called a video/image decoding device. The transmitter 13 may be included in the encoding device 12. The receiver 21 may be included in the decoding device 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding device 12 may encode an input video/image. The encoding device 12 may perform a series of procedures such as prediction, transform, and quantization for compression and coding efficiency. The encoding device 12 may output encoded data (encoded video/image information) in the form of a bitstream.

The transmitter 13 may transmit the encoded video/image information or data output in the form of a bitstream to the receiver 21 of the reception device 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding device 22.

The decoding device 22 may decode the video/image by performing a series of procedures such as dequantization, inverse transform, and prediction corresponding to the operation of the encoding device 12.

The renderer 23 may render the decoded video/image. The rendered video/image may be displayed through the display.

Overview of Image Encoding Apparatus

Figure 2:
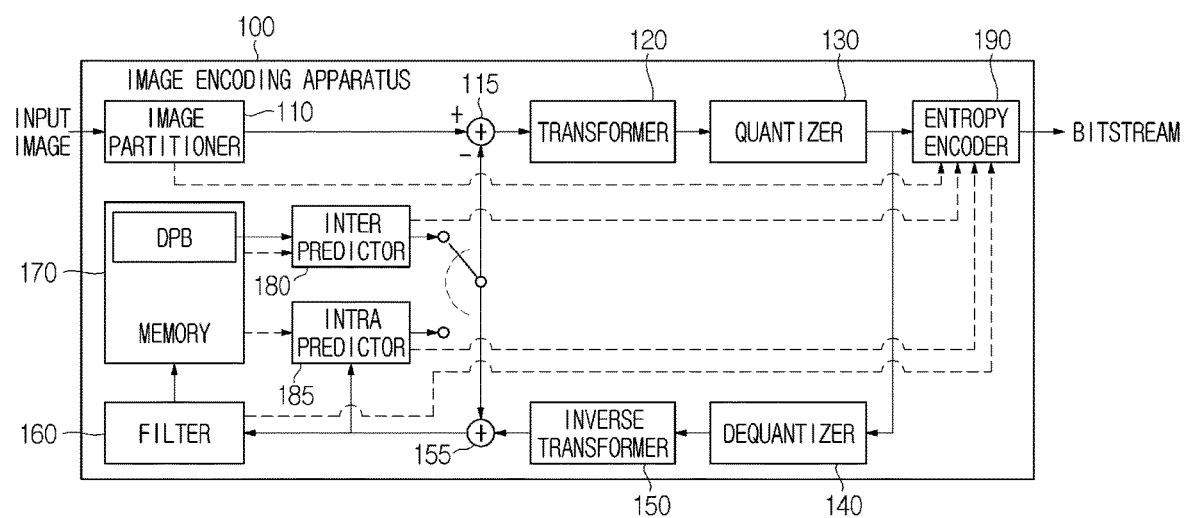
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signalled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signalled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
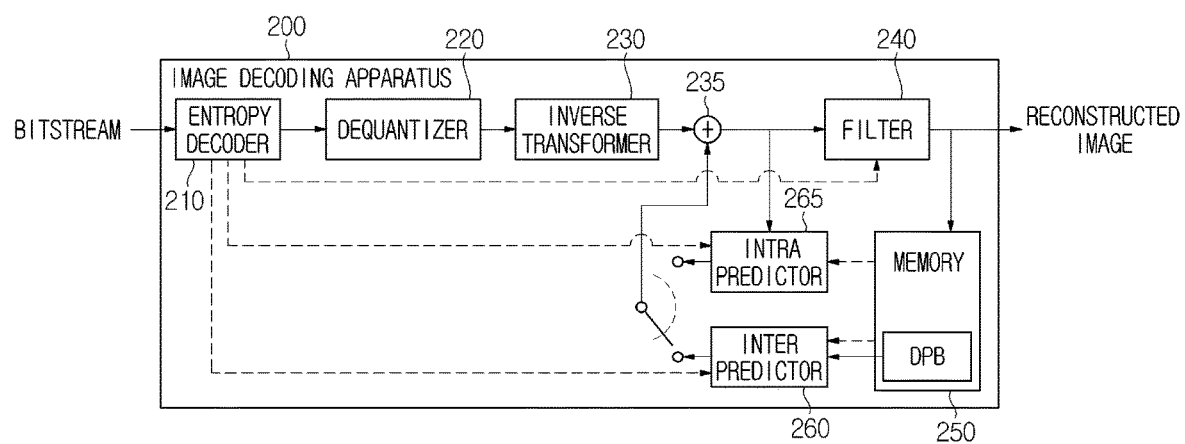
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signalled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image encoding apparatus 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image encoding apparatus 100 may be equally or correspondingly applied to the filter 240, the inter predictor 260, and the intra predictor 265 of the image decoding apparatus 200.

General Image/Video Coding Procedure

In image/video coding, a picture configuring an image/video may be encoded/decoded according to a decoding order. A picture order corresponding to an output order of the decoded picture may be set differently from the decoding order, and, based on this, not only forward prediction but also backward prediction may be performed during inter prediction.

Figure 4:
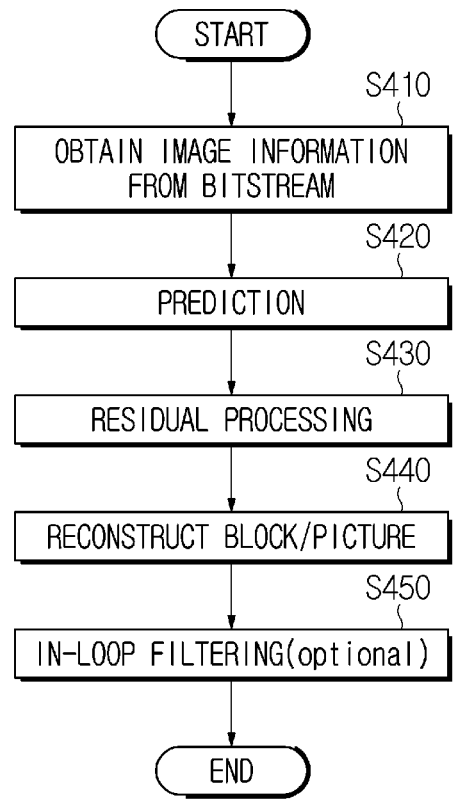
FIGS. 4 and 5 are views showing an example of a picture decoding and encoding procedure, to which an embodiment of the present disclosure is applicable.

FIG. 4 shows an example of a schematic picture decoding procedure, to which embodiment(s) of the present disclosure is applicable. In FIG. 4, S410 may be performed in the entropy decoder 210 of the decoding apparatus, S420 may be performed in a predictor including the intra predictor 265 and the inter predictor 260, S430 may be performed in a residual processor including the dequantizer 220 and the inverse transformer 230, S440 may be performed in the adder 235, and S450 may be performed in the filter 240. S410 may include the information decoding procedure described in the present disclosure, S420 may include the inter/intra prediction procedure described in the present disclosure, S430 may include a residual processing procedure described in the present disclosure, S440 may include the block/picture reconstruction procedure described in the present disclosure, and S450 may include the in-loop filtering procedure described in the present disclosure.

Referring to FIG. 4, the picture decoding procedure may schematically include a procedure (S410) for obtaining image/video information (through decoding) from a bitstream, a picture reconstruction procedure (S420 to S440) and an in-loop filtering procedure (S450) for a reconstructed picture. The picture reconstruction procedure may be performed based on prediction samples and residual samples obtained through inter/intra prediction (S420) and residual processing (S430) (dequantization and inverse transform of the quantized transform coefficient) described in the present disclosure. A modified reconstructed picture may be generated through the in-loop filtering procedure for the reconstructed picture generated through the picture reconstruction procedure, the modified reconstructed picture may be output as a decoded picture, stored in a decoded picture buffer or memory 250 of the decoding apparatus and used as a reference picture in the inter prediction procedure when decoding the picture later. In some cases, the in-loop filtering procedure may be omitted. In this case, the reconstructed picture may be output as a decoded picture, stored in a decoded picture buffer or memory 250 of the decoding apparatus, and used as a reference picture in the inter prediction procedure when decoding the picture later. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may be similarly performed even in the encoding apparatus.

Figure 5:
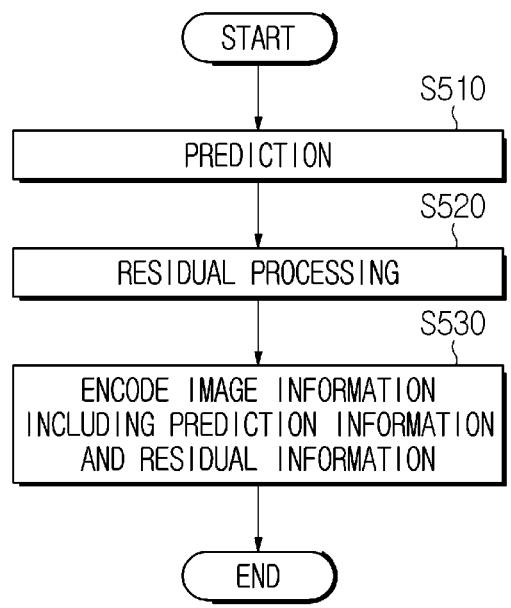

FIG. 5 shows an example of a schematic picture encoding procedure, to which embodiment(s) of the present disclosure is applicable. In FIG. 5, S510 may be performed in the predictor including the intra predictor 185 or inter predictor 180 of the encoding apparatus described above with reference to FIG. 2, S520 may be performed in a residual processor including the transformer 120 and/or the quantizer 130, and S530 may be performed in the entropy encoder 190. S510 may include the inter/intra prediction procedure described in the present disclosure, S520 may include the residual processing procedure described in the present disclosure, and S530 may include the information encoding procedure described in the present disclosure.

Referring to FIG. 5, the picture encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture, as described with respect to FIG. 2. The encoding apparatus may derive (modified) residual samples from a quantized transform coefficient through the dequantizer 140 and the inverse transformer 150, and generate the reconstructed picture based on the prediction samples which are output of S510 and the (modified) residual samples. The reconstructed picture generated in this way may be equal to the reconstructed picture generated in the decoding apparatus. The modified reconstructed picture may be generated through the in-loop filtering procedure for the reconstructed picture, may be stored in the decoded picture buffer or memory 170, and may be used as a reference picture in the inter prediction procedure when encoding the picture later, similarly to the decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the decoding apparatus may perform the in-loop filtering procedure using the same method as the encoding apparatus based on the filtering related information.

Through such an in-loop filtering procedure, noise occurring during image/video coding, such as blocking artifact and ringing artifact, may be reduced and subjective/objective visual quality may be improved. In addition, by performing the in-loop filtering procedure in both the encoding apparatus and the decoding apparatus, the encoding apparatus and the decoding apparatus may derive the same prediction result, picture coding reliability may be increased and the amount of data to be transmitted for picture coding may be reduced.

As described above, the picture reconstruction procedure may be performed not only in the decoding apparatus but also in the encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. Meanwhile, when the current picture/slice/tile group is a P or B picture/slice/tile group, blocks included in the current picture/slice/tile group may be reconstructed based on intra prediction or inter prediction. In this case, inter prediction may be applied to some blocks in the current picture/slice/tile group and intra prediction may be applied to the remaining blocks. The color component of the picture may include a luma component and a chroma component and the methods and embodiments of the present disclosure are applicable to the luma component and the chroma component unless explicitly limited in the present disclosure.

Example of Coding Layer and Structure

A coded video/image according to the present disclosure may be processed, for example, according to a coding layer and structure which will be described below.

Figure 6:
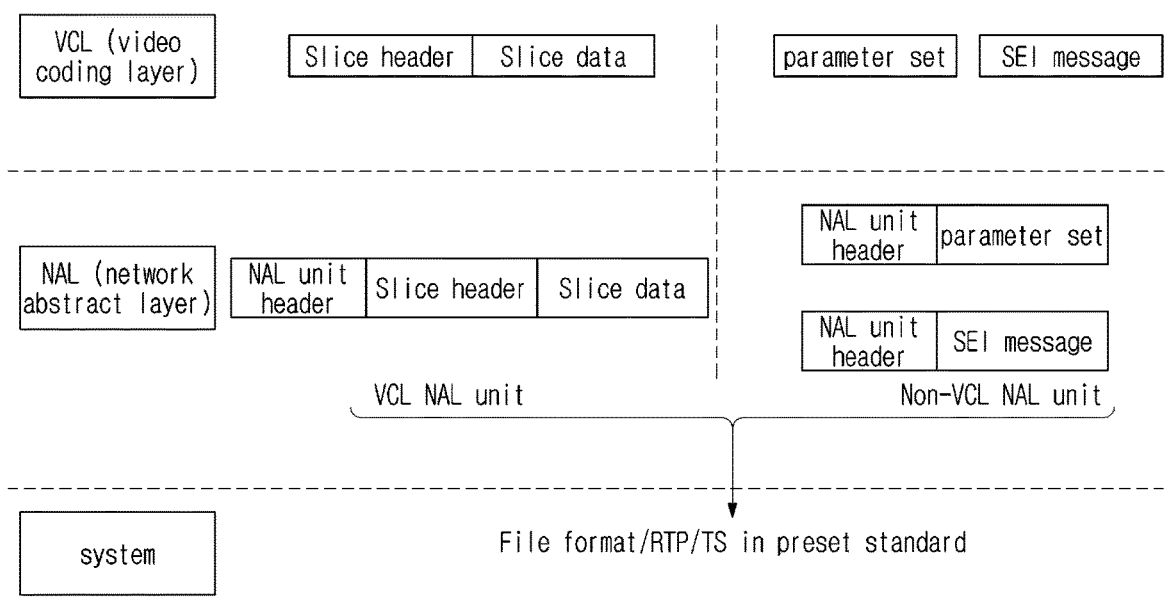
FIG. 6 is a view showing a layer structure for a coded image, to which an embodiment of the present disclosure is applicable.

FIG. 6 is a view showing a layer structure for a coded image. The coded image may be classified into a video coding layer (VCL) for an image decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate an NAL unit. In this case, the RBSP refers to slice data, a parameter set, an SEI message generated in the VCL. The NAL unit header may include NAL unit type information specified according to RBSP data included in a corresponding NAL unit.

As shown in the figure, the NAL unit may be classified into a VCL NAL unit and a non-VCL NAL unit according to the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signalled.

For example, this may be largely classified into a VCL NAL unit type and a non-VCL NAL unit type depending on whether the NAL unit includes information on an image (slice data). The VCL NAL unit type may be classified according to the property and type of the picture included in the VCL NAL unit, and the Non-VCL NAL unit type may be classified according to the type of a parameter set.

An example of the NAL unit type specified according to the type of the parameter set/information included in the Non-VCL NAL unit type will be listed below.

DCI (Decoding capability information) NAL unit: Type for NAL unit including DCI

VPS(Video Parameter Set) NAL unit: Type for NAL unit including VPS

SPS(Sequence Parameter Set) NAL unit: Type for NAL unit including SPS

PPS(Picture Parameter Set) NAL unit: Type for NAL unit including PPS

APS (Adaptation Parameter Set) NAL unit: Type for NAL unit including APS

PH (Picture header) NAL unit: Type for NAL unit including PH

The above-described NAL unit types may have syntax information for a NAL unit type, and the syntax information may be stored in a NAL unit header and signalled. For example, the syntax information may be nal_unit_type, and the NAL unit types may be specified as nal_unit_type values.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters commonly applicable to an overall video. The DCI may include information/parameters related to decoding capability. In the present disclosure, a high level syntax (HLS) may include at least one of the APS syntax, the PPS syntax, the SPS syntax, the VPS syntax, the DCI syntax, the picture header syntax or the slice header syntax. Meanwhile, in the present disclosure, a low level syntax (LLS) may include, for example, a slice data syntax, a CTU syntax, a coding unit syntax, a transform unit syntax, etc.

In the present disclosure, image/video information encoded in the encoding apparatus and signalled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Hypothetical Reference Decoder (HDR) Signalling

In the present disclosure, an HRD refers to a hypothetical reference decoder. The HRD may be a hypothetical decoder model that specifies constraints on the variability of conforming NAL unit streams or conforming byte streams that an image encoding process may produce. In the present disclosure, a CVS may refer to a coded video sequence.

An HRD structure may be signalled in a VPS (video parameter set) or an SPS (sequence parameter set).

FIG. 7 is a view exemplarily illustrating an HRD structure signaled in VPS.

As shown in FIG. 7, the VPS may include various information related to HRD parameters.

In FIG. 7, a first value (e.g., 1) of vps_general_hrd_params_present_flag specifies that the VPS contains a general_hrd_parameters( ) syntax structure and other HRD parameters. A second value (e.g., 0) of vps_general_hrd_params_present_flag specifies that the VPS does not contain a general_hrd_parameters( ) syntax structure or other HRD parameters.

When vps_general_hrd_params_present_flag is equal to a first value (e.g., 1), a general_hrd_parameters( ) syntax structure may be signaled in the VPS. The general_hrd_parameters( ) syntax structure may be a syntax structure for signaling a general HRD parameter.

When vps_max_sublayers_minus1 is greater than 0. vps_sublayer_cpb_params_present_flag may be signaled. vps_max_sublayers_minus1 plus 1 specifies a maximum number of temporal sublayers that may be present in a layer specified by the VPS. The value of vps_max_sublayers_minus1 shall be in the range of 0 to 6, inclusive.

A first value (e.g., 1) of vps_sublayer_cpb_params_present_flag specifies that the i-th ols_hrd_parameters( ) syntax structure in the VPS contains HRD parameters for the sublayer representations. In this case, the sublayer may be a sublayer with TemporalId in the range of 0 to vps_hrd_max_tid[i], inclusive. A second value (e.g., 0) of vps_sublayer_cpb_params_present_flag specifies that the i-th ols_hrd_parameters( ) syntax structure in the VPS contains HRD parameters for the sublayer representation with TemporalId equal to vps_hrd_max_tid[i] only. When vps_max_sublayers_minus1 is equal to 0, the value of vps_sublayer_cpb_params_present_flag is inferred to be equal to 0.

When vps_sublayer_cpb_params_present_flag is equal to a second value (e.g., 0), the HRD parameters for the sublayer representations with TemporalId in the range of 0 to vps_hrd_max_tid[i]−1, inclusive, are inferred to be the same as the HRD parameters for a sublayer representation with TemporalId equal to vps_hrd_max_tid[i]. In this case, the HRD parameters may include the fixed_pic_rate_general_flag[i] in an ols_hrd_parameters( ) syntax structure to the sublayer_hrd_parameters(i) syntax structure.

vps_num_ols_hrd_params_minus1 plus 1 specifies the number of ols_hrd_parameters( ) syntax structures present in the VPS when vps_general_hrd_params_present_flag is equal to a first value (e.g., 1). The value of vps_num_ols_hrd_params_minus1 shall be in the range of 0 to NumMultiLayerOlss−1, inclusive. In this case, NumMultiLayerOlss may specify the number of multi-layer OLSs, and the multi-layer OLS may mean an output layer set containing more than one layer.

vps_hrd_max_tid[i] specifies the TemporalId of the highest sublayer representation for which the HRD parameters are contained in the i-th ols_hrd_parameters( ) syntax structure. The value of vps_hrd_max_tid[i] shall be in the range of 0 to vps_max_sublayers_minus1, inclusive. When not present, the value of vps_hrd_max_tid[i] is inferred to be equal to vps_max_sublayers_minus1.

vps_ols_hrd_idx[i] specifies the index, to the list of ols_hrd_parameters( ) syntax structures in the VPS. vps_ols_hrd_idx[i] may specify the ols_hrd_parameters( ) syntax structure that applies to the i-th multi-layer OLS. The value of vps_ols_hrd_idx[i] shall be in the range of 0 to vps_num_ols_hrd_params_minus1, inclusive.

When vps_ols_hrd_idx[i] is not present, it is inferred as follows:
  If vps_num_ols_hrd_params_minus1 is equal to 0, the value of vps_ols_hrd_idx[[i] is inferred to be equal to 0.
  Otherwise (vps_num_ols_hrd_params_minus1+1 is greater than 1 and equal to NumMultiLayerOlss), the value of vps_ols_hrd_idx[i] is inferred to be equal to i.

For a single-layer OLS, the applicable ols_hrd_parameters( ) syntax structure is present in the SPS referred to by the layer in the OLS.

Each ols_hrd_parameters( ) syntax structure in the VPS shall be referred to by at least one value of vps_ols_hrd_idx[i] for i in the range of 1 to NumMultiLayerOlss−1, inclusive.

FIG. 8 is a view exemplarily illustrating an HRD structure signaled in the SPS.

In the example shown in FIG. 8, sps_ptl_dpb_hrd_params_present_flag equal to a first value (e.g., 1) may specify that a profile_tier_level( ) syntax structure and a dpb_parameters( ) syntax structure are present in the SPS. profile_tier_level( ) may be a syntax structure for transmitting a parameter for a profile tier level, and dpb_parameters( ) may be a syntax structure for transmitting a DPB (decoded picture buffer) parameter. In addition, sps_ptl_dpb_hrd_params_present_flag equal to a first value (e.g., 1) may specify that a general_hrd_parameters( ) syntax structure and an ols_hrd_parameters( ) syntax structure may be present in the SPS. sps_ptl_dpb_hrd_params_present_flag equal to a second value (e.g., 0) may specify that the four syntax structures are not present in the SPS.

When sps_ptl_dpb_hrd_params_present_flag is equal to 1, sps_general_hrd_params_present_flag may be signaled.

sps_general_hrd_params_present_flag equal to a first value (e.g., 1) may specify that the SPS contains a general_hrd_parameters( ) syntax structure and an ols_hrd_parameters( ) syntax structure. sps_general_hrd_params_present_flag equal to a second value (e.g., 0) may specify that the SPS does not contain the general_hrd_parameters( ) syntax structure or the ols_hrd_parameters( ) syntax structure.

As shown in FIG. 8, when sps_max_sublayers_minus1 is greater than 0, sps_sublayer_cpb_params_present_flag may be signaled. In this case, sps_max_sublayers_minus1 plus 1 may specify a maximum number of temporal sublayers which may be present in each coded layer video sequence (CLVS) that refers to the SPS. sps_sublayer_cpb_params_present_flag equal to a first value (e.g., 1) may specify that the ols_hrd_parameters( ) syntax structure in the SPS contains an HRD parameter for sublayers with a temporal layer identifier TemporalId equal to 0 to sps_max_sublayers_minus1. sps_sublayer_cpb_params_present_flag equal to a second value (e.g., 0) may specify that the ols_hrd_parameters( ) syntax structure in the SPS contains an HRD parameter for a sublayer with a temporal layer identifier TemporalId of only sps_max_sublayers_minus1. When sps_max_sublayers_minus1 is equal to 0, the value of sps_sublayer_cpb_params_present_flag may be inferred to be equal to a second value (e.g., 0).

When sps_sublayer_cpb_params_present_flag is equal to a second value (e.g., 0), the HRD parameter for sublayers with the temporal layer identifier TemporalId of 0 to sps_max_sublayers_minus1−1 may be inferred to be equal to the HRD parameter for the sublayer with the temporal layer identifier TemporalId of sps_max_sublayers_minus1.

FIG. 9 is a view exemplarily illustrating a general_hrd_parameterso syntax structure.

The general_hrd_parameters( ) syntax structure of FIG. 9 provides some of the sequence-level HRD parameters used in the HRD operations.

It is a requirement of bitstream conformance that the content of the general_hrd_parameters( ) syntax structure present in any VPSs or SPSs in the bitstream shall be identical.

When included in a VPS, the general_hrd_parameters( ) syntax structure applies to all output layer sets (OLSs) specified by the VPS. When included in an SPS, the general_hrd_parameters( ) syntax structure applies to the OLS that includes only the layer that is the lowest layer among the layers that refer to the SPS. In this case, the lowest layer may be an independent layer. The independent layer may mean a layer encoded/decoded without referring to other layers.

Hereinafter, syntax elements related to the present disclosure among the syntax elements shown in FIG. 9 will be focused upon. The meanings and uses of syntax elements not described in the present disclosure may be the same as in the prior art.

In FIG. 9, general_nal_hrd_params_present_flag equal to a first value (e.g., 1) specifies that a NAL HRD parameter (pertaining to Type II bitstream conformance point) is present in the general_hrd_parameters( ) syntax structure. general_nal_hrd_params_present_flag equal to a second value (e.g., 0) specifies that the NAL HRD parameters is not present in the general_hrd_parameters( ) syntax structure. In the above, Type II bitstream may mean a bitstream including syntax elements (leading_zero_8bits, zero_byte, etc.) constructing a byte stream from additional non-VCL NAL units and/or NAL unit streams as well as VCL NAL units, PH NAL units and filler data NAL units for all access units (AUs) in the bitstream.

general_vcl_hrd_params_present_flag equal to a first value (e.g., 1) specifies that a VCL HRD parameter (pertaining to Type I bitstream conformance point) is present in the general_hrd_parameters( ) syntax structure. general_vcl_hrd_params_present_flag equal to a second value (e.g., 0) specifies that the VCL HRD parameter is not present in the general_hrd_parameters( ) syntax structure. In the above, Type I bitstream may mean a bitstream including VCL NAL units, PH NAL units and filter data NAL units for all access units (AUs) in the bitstream.

It is a requirement of bitstream conformance that both general_nal_hrd_params_present_flag and general_vcl_hrd_ params_present_flag included in each general_hrd_parameters( ) syntax structure are constrained not to have a second value (e.g., 0).

FIG. 10 is a view exemplarily illustrating an ols_hrd_parameters( ) syntax structure.

When an ols_hrd_parameters( ) syntax structure is included in a VPS, the OLSs to which the ols_hrd_parameters( ) syntax structure applies are specified by the VPS. When an ols_hrd_parameters( ) syntax structure is included in an SPS, the ols_hrd_parameters( ) syntax structure may apply to the OLS that includes only the layer that is the lowest layer among the layers that refer to the SPS. In this case, the lowest layer may be an independent layer.

Hereinafter, syntax elements related to the present disclosure among the syntax elements shown in FIG. 10 will be focused upon. The meanings and uses of syntax elements not described in the present disclosure may be the same as in the prior art.

In FIG. 10, fixed_pic_rate_general_flag[i] equal to a first value (e.g., 1) indicates that, when Htid is equal to i, the temporal distance between the HRD output times of consecutive pictures in output order is constrained as specified below. fixed_pic_rate_general_flag[i] equal to a second value (e.g., 0) indicates that this constraint may not apply. When fixed_pic_rate_general_flag[i] is not present, it is inferred to be equal to 0. fixed_pic_rate_general_flag may be information specifying whether to generally use a fixed picture rate.

In the present disclosure, Htid may be an identifier which identifies the highest temporal sublayer among temporal sublayers to be decoded in the bitstream.

fixed_pic_rate_within_cvs_flag[i] equal to a first value (e.g., 1) indicates that, when Htid is equal to i, the temporal distance between the HRD output times of consecutive pictures in output order is constrained as specified below. fixed_pic_rate_within_cvs_flag[i] equal to a second value (e.g., 0) indicates that this constraint may not apply. fixed_pic_rate_within_cvs_flag may be information specifying whether to use a fixed picture rate in the CVS.

When fixed_pic_rate_general_flag[i] is equal to a first value (e.g., 1), the value of fixed_pic_rate_within_cvs_flag[i] is inferred to be equal to 1.

elemental_duration_in_tc_minus1[i] plus 1 (when present) specifies, when Htid is equal to i, the temporal distance, in clock ticks, between the elemental units that specify the HRD output times of consecutive pictures in output order. The value of elemental_duration_in_tc_minus1[i] shall be in the range of 0 to 2047, inclusive.

When Htid is equal to i and fixed_pic_rate_general_flag[i] is equal to a first value (e.g., 1) for a CVS containing a picture n, and the picture n is a picture that is output and is not the last picture in the bitstream (in output order) that is output, the value of the variable DpbOutputElementalInterval[n] may be specified as shown in Equation 1 below. In the present disclosure, DpbOutputElementalInterval[n] may mean a refresh interval of the picture n.

$$\text{DpbOutputElementalInterval}[n] = \text{DpbOutputInterval}[n]/\text{elementalOutputPeriods} \qquad \text{(Equation 1)}$$

In Equation 1 above, DpbOutputInterval[n] is a value according to a conventional rule and elementalOutputPeriods is specified as follows:

If a PT SEI message is present for the picture n, elementalOutputPeriods is specified equal to the value of pt_display_elemental_periods_minus1+1. The PT SEI message may mean an SEI message related to picture timing. pt_display_elemental_periods_minus1+1 may specify the number of picture period intervals occupied by decoded pictures of a current access unit (AU) under a predetermined condition.

Otherwise, elementalOutputPeriods is specified equal to 1.

When Htid is equal to i and fixed_pic_rategeneral_flag[i] is equal to a first value (e.g., 1) for a CVS containing the picture n, and the picture n is a picture that is output and is not the last picture in the bitstream (in output order) that is output, the value computed for DpbOutputElementalInterval [n] shall be equal to ClockTick*(elemental_duration_in_tc_minus1[i]+1).

When Htid is equal to i and fixed_pic_rate_within_cvs_flag[i] is equal to a first value (e.g., 1) for a CVS containing the picture n, and the picture n is a picture that is output and is not the last picture in the CVS (in output order) that is output, the value computed for DpbOutputElementalInterval [n] shall be equal to ClockTick*(elemental_duration_in_tc_minus1[i]+1)

low_delay_hrd_flag[i] specifies the HRD operational mode, when Htid is equal to i. When not present, the value of low_delay_hrd_flag[i] is inferred to be equal to 0.

FIG. 11 is a view exemplarily illustrating a sublayer_hrd_parameters( ) syntax structure.

When a sublayer_hrd_parameters( ) syntax structure is included in the i-th ols_hrd_parameters( ) syntax structure in a VPS, the value of maxSublayersMinus1 is set equal to vps_hrd_max_tid[i]. When a sublayer_hrd_parameters( ) syntax structure is included in the ols_hrd_parameters( ) syntax structure in an SPS, the value of maxSublayersMinus1 is set equal to sps_max_sublayers_minus1.

Hereinafter, syntax elements related to the present disclosure among the syntax elements shown in FIG. 11 will be focused upon. The meanings and uses of syntax elements not described in the present disclosure may be the same as in the prior art.

In FIG. 11, bit_rate_value_minus1[i][j] (together with bit_rate_scale) specifies the maximum input bit rate for the j-th CPB with Htid equal to i when the CPB operates at the AU level. bit_rate_value_minus1[i][j] shall be in the range of 0 to $2^{32}-2$, inclusive. For any j greater than 0 and any particular value of i, bit_rate_value_minus1[i][j] shall be greater than bit_rate_value_minus1[i][j−1].

cpb_size_value_minus1[i][j] is used together with cpb_size_scale to specify the j-th CPB size with Htid equal to i when the CPB operates at the AU level. cpb_size_value_minus1[i][j] shall be in the range of 0 to $2^{32}-2$, inclusive. For any j greater than 0 and any particular value of i, cpb_size_value_minus1[i][j] shall be less than or equal to cpb_size_value_minus1[i][j−1].

cpb_size_du_value_minus1[i][j] is used together with cpb_size_du_scale to specify the i-th CPB size with Htid equal to i when the CPB operates at DU level. cpb_size_du_value_minus1[i][j] shall be in the range of 0 to $2^{32}-2$, inclusive. For any j greater than 0 and any particular value of i, cpb_size_du_value_minus1[i][j] shall be less than or equal to cpb_size_du_value_minus1[i][j−1].

bit_rate_du_value_minus1[i][j] (together with bit_rate_scale) specifies the maximum input bit rate for the j-th CPB with Htid equal to i when the CPB operates at the DU level. bit_rate_du_value_minus1[i][j] shall be in the range of 0 to $2^{32}-2$, inclusive. For any j greater than 0 and any particular value of i, bit_rate_du_value_minus1[i][j] shall be greater than bit_rate_du_value_minus1[i][j−1].

cbr_flag[i][j] equal to a second value (e.g., 0) specifies that, to decode corresponding bitstream by the HRD using the j-th CPB specification, the hypothetical stream scheduler (HSS) operates in an intermittent bit rate mode. cbr_flag[i][j] equal to a first value (e.g., 1) specifies that the HSS operates in a constant bit rate (CBR) mode.

When the cbr_flag[i][j] syntax element is not present, it is inferred as follows:
  If general_hrd_params_present_flag is equal to a first value (e.g., 1), cbr_flag[i][j] is inferred to be equal to cbr_flag[maxSublayersMinus1][j].
  Otherwise (general_hrd_params_present_flag is equal to a second value (e.g., 0)), the value of cbr_flag[i][j] is inferred to be equal to a second value (e.g., 0).

Hereinafter, problems of conventional HRD parameter signaling will be described.

As described above, according to the requirement for conventional bitstream conformance, the values of general_nal_hrd_params_present_flag and general_vcl_hrd_params_present_flag in each general_hrd_parameterso syntax structure shall not be both equal to a second value (e.g., 0). However, in some use cases, it is useful to have simple signalling mechanism for decoder to compute timing for output without having to signal complex HRD parameters. To this end, it is necessary to provide a mechanism capable of improving a conventional signalling method of HRD parameters.

According to the present disclosure, the following items may be applicable in order to improve the conventional signaling method of HRD parameters. The following items may be applicable individually or in combinations.

(Item 1) The values of general_nal_hrd_params_present_flag and general_vcl_hrd_params_present_flag are allowed to be both equal to a second value (e.g., 0).

(Item 2) When a general HRD parameters structure is present (i.e., vps_general_hrd_params_present_flag is equal to a first value (e.g., 1) or sps_general_hrd_params_present_flag is equal to a first value (e.g., 1)), and the values of both general_nal_hrd_params_present_flag and general_vcl_hrd_params_present_flag are equal to a second value (e.g., 0), information about timing based on POC proportion may be present in the general HRD parameters structure (i.e., poc_proportional_to_timing_flag and num_ticks_poc_diff_one_minus1). In Item 2, it may be constrained that when the values of both general_nal_hrd_params_present_flag and general_vcl_hrd_params_present_flag are equal to a second value (e.g., 0), the value of poc_proportional_to_timing_flag shall be equal to a first value (e.g., 1).

(Item 3) Alternatively, when the general HRD parameters structure is present (i.e., vps_general_hrd_params_present_flag is equal to a first value (e.g., 1) or sps_general_hrd_params_present_flag is equal to a first value (e.g., 1)), and the values of general_nal_hrd_params_present_flag and general_vcl_hrd_params_present_flag are both equal to 0, information about timing based on POC proportion is present in the general HRD parameters (i.e., num_ticks_poc_diff_one_minus1).

(Item 4) When the general HRD parameters structure is present (i.e., vps_general_hrd_params_present_flag is equal to a first value (e.g., 1) or sps_general_hrd_params_present_flag is equal to a first value (e.g., 1)), and the values of general_nal_hrd_params_present_flag and general_vcl_hrd_params_present_flag are both equal to a second value (e.g., 0), it may further be specified that the first picture in the CVS (or CLVS) that is not the first picture in the bitstream may be proportional to the output timing of the last output picture before the CVS. That is, it may operate as if last output picture has POC equal to the first picture in the CVS minus one.

(Item 5) Alternatively, a flag may be present to specify whether Item 4 applies. The flag may be called initial_poc_proportional_to_timing_flag. When the flag is equal to 1, Item 4 applies, otherwise, Item 4 may not apply.

(Item 6) When general_nal_hrd_params_present_flag and general_vcl_hrd_params_present_flag are both equal to a second value (e.g., 0), no further HRD signalling for OLS is present.

(Item 7) num_ticks_poc_diff_one_minus1 may be coded as u(v), instead of ue(v). The length (i.e., the number of bits for signalling) of um_ticks_poc_diff_one_minus1 is specified by a new syntax element that is signalled before it. The new syntax element may be called num_ticks_poc_diff_one_len. num_ticks_poc_diff_one_len may be coded as ue(v).

In the above, u(v) may be an unsigned integer using v bits. In this case, the number v of bits may vary in a manner dependent on the values of other syntax elements. In addition, ue(v) may be an unsigned integer 0-th order Exp-Golomb-coded syntax element with the left bit first.

(Item 8) In another alternative for Item 2, poc_proportional_to_timing_flag and num_ticks_poc_diff_one_minus1 are present in general HRD parameters structure regardless of the values of general_nal_hrd_params_present_flag and general_vcl_hrd_params_present_flag. In this case, it is constrained that the values of poc_proportional_to_timing_flag, general_nal_hrd_params_present_flag and general_vcl_hrd_ params_present_flag shall not all be equal to a second value (e.g., 0). For example, when general_nal_hrd_params_present_flag and general_vcl_hrd_params_present_flag are both equal to 0, it is constrained that the value of poc_proportional_to_timing_flag shall be equal to 1.

(Item 9) Yet in another alternative, when the value of poc_proportional_to_timing_flag shall be equal to a first value (e.g., 1), the value of general_nal_hrd_params_present_flag and general_vcl_hrd_params_present_flag shall be both equal to a second value (e.g., 0).

(Item 10) Yet in another alternative, OLS HRD signalling may be present when at least one of the following conditions is true:

(Condition 1) At least general_nal_hrd_params_present_flag or general_vcl_hrd_params_present_flag is equal to a first value (e.g., 1).

(Condition 2) poc_proportional_to_timing_flag, general_nal_hrd_params_present_flag, and general_vcl_hrd_params_present_flag are all equal to a second value (e.g., 0).

(Item 11) When general_nal_hrd_params_present_flag and general_vcl_hrd_params_present_flag are both equal to a second value (e.g., 0) (i.e., only minimum HRD signalling is present), the bitstream is running on fixed picture rate. Item 11 above may be expressed as follows.

When general_nal_hrd_params_present_flag and general_vcl_hrd_params_present_flag are both equal to a second value (e.g., 0), there shall be at least one value of fixed_pic_rate_within_cvs_flag[i] equal to a first value (e.g., 1). In this case, i may be in the range of 0 to maxSublayersMinus1.

Alternatively, when general_nal_hrd_params_present_flag and general_vcl_hrd_params_present_flag are both equal to a second value (e.g., 0), there shall be at least one value of elemental_duration_in_tc_minus1[i].

(Item 12) When poc_proportional_to_timing_flag, general_nal_hrd_params_present_flag, and general_vcl_hrd_params_present_flag are all equal to a second value (e.g., 0), it is constrained that fixed_pic_rate_general_flag[i] or fixed_pic_rate_within_cvs_flag[i] or both shall be equal to a first value (e.g., 1).

Hereinafter, various embodiments according to the present invention will be described. However, the technical scope of the present disclosure is not limited thereto and may include embodiments in which various embodiments described below are combined.

FIG. 12 is a view exemplarily illustrating general_hrd_parameters( ) syntax structure according to an embodiment of the present disclosure.

FIG. 12 may show a modification of the general_hrd_parameters( ) syntax structure of FIG. 9.

In FIGS. 9 and 12, a repeated description will be omitted.

FIG. 12 may show an embodiment to which at least one of Item 1, Item 2 and Items 4 to 6 is applied.

In the embodiment of FIG. 12, a constraint that general_nal_hrd_params_present_flag and general_vcl_hrd_params_present_flag shall not be both equal to a second value (e.g., 0) may not be applied.

As shown in FIG. 12, some syntax elements may be signaled when general_nal_hrd_params_present_flag is equal to a first value (e.g., 1) or general_vcl_hrd_params_present_flag is equal to a first value (e.g., 1). When general_nal_hrd_params_present_flag and general_vcl_hrd_ params_present_flag are both equal to a second value (e.g., 0), poc_proportional_to_timing_flag may be signaled. In addition, num_ticks_poc_diff_one_minus1 may be additionally signaled based on the value of poc_proportional_to_timing_flag.

poc_proportional_to_timing_flag equal to a first value (e.g., 1) indicates that the picture order count value for each picture in the CVS that is not the first picture in the CVS, in decoding order, is proportional to the output time of the picture relative to the output time of the first picture in the CVS. poc_proportional_to_timing_flag equal to a second value (e.g., 0) indicates that the picture order count value for each picture in the CVS that is not the first picture in the CVS, in decoding order, may or may not be proportional to the output time of the picture relative to the output time of the first picture in the CVS. poc_proportional_to_timing_flag may be information indicating whether the output time of the picture and the POC value of the picture are proportional.

For the first picture in the CVS that is not the first picture in the bitstream, its output time may be proportional to the output time of the last output picture before the CVS. That is, it may operate as if the last output picture has POC equal to the first picture in the CVS minus one.

When poc_proportional_to_timing_flag is equal to a first value (e.g., 1), num_ticks_poc_diff_one_minus1 may be signaled.

num_ticks_poc_diff_one_minus1 plus 1 specifies the number of clock ticks. The number of clock ticks may correspond to a difference of picture order count values equal to 1. The value of num_ticks_poc_diff_one_minus1 shall be in the range of 0 to $2^{32}-2$, inclusive.

In addition, according to the embodiment of FIG. 12, signaling of the HRD parameter in the VPS and/or SPS may be changed.

FIG. 13 is a view exemplarily illustrating a modification of a syntax structure of the VPS and the SPS according to the embodiment of FIG. 12.

As shown in the upper syntax structure of FIG. 13, for example, the syntax structure of the VPS described with reference to FIG. 7 may be changed such that the HRD parameter in the VPS is signaled when general_nal_hrd_params_present_flag is equal to a first value (e.g., 1) or general_vcl_hrd_params_present_flag is equal to a first value (e.g., 1).

Similarly, as shown in the lower syntax structure of FIG. 13, the syntax structure of the SPS described with reference to FIG. 8 may be changed such that the HRD parameter in the SPS is signaled when general_nal_hrd_params_present_flag is equal to a first value (e.g., 1) or general_vcl_hrd_params_present_flag is equal to a first value (e.g., 1).

According to the embodiment of FIG. 12 and/or FIG. 13, when general_nal_hrd_params_present_flag is equal to a first value (e.g., 1) or general_vcl_hrd_params_present_flag is equal to a first value (e.g., 1), signaling of a complex HRD parameter is possible in the prior art. In addition, when general_nal_hrd_params_present_flag and general_vcl_hrd_ params_present_flag are both equal to a second value (e.g., 0), a simple signaling mechanism of timing information may be provided. According to the embodiment of FIG. 12 and/or FIG. 13, a flexible signaling structure of timing information applicable to various use cases may be provided.

As a modification of FIG. 12, when general_nal_hrd_params_present_flag and general_vcl_hrd_params_present_flag are both equal to a second value (e.g., 0), poc_proportional_to_timing_flag may not be signaled and num_ticks_poc_diff_one_minus1 may be signaled. Therefore, the number of bits necessary for the simple signaling mechanism of timing information may be reduced, and a process of parsing poc_proportional_to_timing_flag and determining the value thereof may be skipped, thereby implementing a rapid encoding/decoding process.

FIG. 14 is a view exemplarily illustrating a general_hrd_parameterso syntax structure according to another embodiment of the present disclosure.

FIG. 14 may show a modification of the general_hrd_parameters( ) syntax structure of FIG. 9.

In FIGS. 9 and 14, a description of overlapping parts will be omitted.

FIG. 14 may show an embodiment to which Item 8 above is applied.

In the embodiment of FIG. 14, a constraint that general_nal_hrd_params_present_flag and general_vcl_hrd_params_present_flag shall not be both equal to a second value (e.g., 0) may not be applied.

As shown in FIG. 14, poc_proportional_to_timing_flag may be signaled. In addition, based on the value of poc_proportional_to_timing_flag, num_ticks_poc_diff_one_minus1 may be additionally signaled. Since the description of the meanings of poc_proportional_to_timing_flag and num_ticks_poc_diff_one_minus1 is the same as that described with reference to FIG. 13, a repeated description will be omitted.

Thereafter, general_nal_hrd_params_present_flag and/or general_vcl_hrd_params_present_flag may be signaled, and subsequent HRD parameters may be signaled based on the value of general_nal_hrd_params_present_flag and/or the value of general_vcl_hrd_params_present_flag.

For example, as shown in FIG. 14, some syntax elements may be signaled when general_nal_hrd_params_present_flag is equal to a first value (e.g., 1) or general_vcl_hrd_params_present_flag is equal to a first value (e.g., 1). That is, when general_nal_hrd_params_present_flag and general_vcl_hrd_params_present_flag are both equal to a second value (e.g., 0), some syntax elements may not be signaled.

In the embodiment of FIG. 14, it is a constraint of bitstream conformance that, when general_nal_hrd_params_present_flag and general_vcl_hrd_params_present_flag are both equal to 0, the value of poc_proportional_to_timing_flag shall be equal to 1.

According to the embodiment of FIG. 14, when general_nal_hrd_params_present_flag is equal to a first value (e.g., 1) or general_vcl_hrd_params_present_flag is equal to a first value (e.g., 1), signaling of a complex HRD parameter is possible as in the prior art. In addition, when general_nal_hrd_params_present_flag and general_vcl_hrd_ params_present_flag are both equal to a second value (e.g., 0), a simple signaling mechanism of timing information may be provided. According to the embodiment of FIG. 14, a flexible signaling structure of timing information applicable to various use cases may be provided.

According to the embodiment of FIG. 14, signaling of the HRD parameter in the VPS and/or the SPS may be changed.

FIG. 15 is a view exemplarily illustrating a modification of a syntax structure of a VPS and an SPS according to the embodiment of FIG. 14.

For example, as shown in the upper syntax structure of FIG. 15, the syntax structure of the VPS described with reference to FIG. 7 may be changed such that the HRD parameter in the VPS is signaled when poc_proportional_to_timing_flag is equal to a second value (e.g., 0).

Similarly, as shown in the lower syntax structure of FIG. 15, the syntax structure of the SPS described with reference to FIG. 8 may be changed such that the HRD parameter in the SPS is signaled when poc_proportional_to_timing_flag is equal to a second value (e.g., 0).

According to the embodiments of FIG. 14 and/or FIG. 15, when general_nal_hrd_params_present_flag is equal to a first value (e.g., 1) or general_vcl_hrd_params_present_flag is equal to a first value (e.g., 1), signaling of the complex HRD parameter is possible as in the prior art. In addition, when general_nal_hrd_params_present_flag and general_vcl_hrd_params_present_flag are both equal to a second value (e.g., 0), a simple signaling mechanism of timing information may be provided. According to the embodiments of FIG. 14 and/or FIG. 15, a flexible signaling structure of timing information applicable to various use cases may be provided.

FIG. 16 is a view exemplarily illustrating an ols_hrd_parameterso syntax structure according to another embodiment of the present disclosure.

FIG. 16 may show a modification of the old_hrd_parameters( ) syntax structure of FIG. 10.

In FIGS. 10 and 16, a repeated description will be omitted.

FIG. 16 may show an embodiment to which at least one of Item 11 or Item 12 is applied.

As shown in FIG. 16, at least some (e.g., low_delay_hrd_flag) of the HRD parameters may be signaled when general_nal_hrd_params_present_flag is equal to a first value (e.g., 1) or general_vcl_hrd_params_present_flag is equal to a first value (e.g., 1). Accordingly, when general_nal_hrd_params_present_flag and general_vcl_hrd_params_present_flag are both equal to a second value (e.g., 0), the corresponding parameter may not be signaled.

In the embodiment of FIG. 16, it is a constraint of bitstream conformance that, when the value of general_nal_hrd_params_present_flag and general_vcl_hrd_params_present_flag are both equal to a second value (e.g., 0), the value of fixed_pic_rate_general_flag[i] or fixed_pic_rate_within_cvs_flag[i] shall be equal to a first value (e.g., 1). In this case, i may be in the range from a variable firstSubLayer specifying a first sublayer to a variable maxSublayers specifying a maximum sublayer, inclusive.

In the embodiment of FIG. 16, it is a requirement of bitstream conformance that, when the values of general_nal_hrd_params_present_flag and general_vcl_hrd_params_present_flag are both equal to a second value (e.g., 0), there shall be at least one value of fixed_pic_rate_within_cvs_flag[i] equal to a first value (e.g., 1). In this case, i may be in the range of 0 to maxSublayersMinus1.

In the embodiment of FIG. 16, elemental_duration_in_tc_minus1[i] plus 1 (when present) specifies, when Htid is equal to i, the temporal distance, in clock ticks, between the elemental units that specify the HRD output times of consecutive pictures in output order. The value of elemental_duration_in_tc_minus1[i] shall be in the range of 0 to 2047, inclusive.

Figures 17, 18:
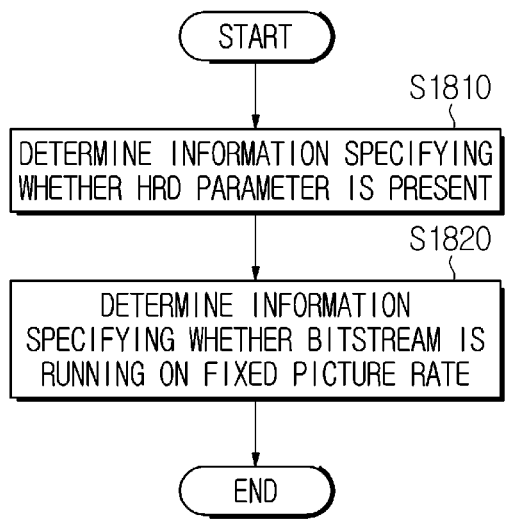
FIG. 17 is a view illustrating a process of deriving DpbOutputElementalInterval[n] in the embodiment of FIG. 16.
FIG. 18 is a view illustrating an image encoding method according to the present disclosure.

When Htid is equal to i and fixed_pic_rate_general_flag[i] is equal to a first value (e.g., 1) for a CVS containing a picture n, and the picture n is a picture that is output and is not the last picture in the bitstream (in output order) that is output, the value of the variable DpbOutputElementalInterval[n] may be specified as shown in FIG. 17.

FIG. 17 is a view illustrating a process of deriving DpbOutputElementalInterval[n] in the embodiment of FIG. 16.

In FIG. 17, ClockTick and DpbOutputInterval[n] may be specified equal to be a value according to the conventional rule.

When Htid is equal to i and fixed_pic_rategeneral_flag[i] is equal to a first value (e.g., 1) for a CVS containing a picture n, and the picture n is a picture that is output and is not the last picture in the bitstream (in output order) that is output, the value computed for DpbOutputElementalInterval[n] shall be equal to ClockTick*(elemental_duration_in_tc_minus1[i]+1), when one of the following conditions is true for the following picture in output order nextPicInOutputOrder.

(Condition 3) A picture nextPicInOutputOrder is in the same CVS as a picture n.

(Condition 4) A picture nextPicInOutputOrder is in a different CVS from a picture n and fixed_pic_rate_general_flag[i] is equal to a first value (e.g., 1) in the CVS containing picture nextPicInOutputOrder, the value of ClockTick is the same for both CVSs, and the value of elemental_duration_in_tc_minus1[i] is the same for both CVSs.

As described above, fixed_pic_rate_general_flag[i] or fixed_pic_rate_within_cvs_flag[i] may specify whether to apply a constraint on a temporal time between HRD output times of consecutive pictures in output order when Htid is equal to i. According to the above constraint, the temporal distance between the HRD output times of the consecutive pictures in output order may have a fixed value. That is, pictures in a bitstream (or CVS) may be output at a fixed picture rate. Accordingly, fixed_pic_rate_general_flag[i] or fixed_pic_rate_within_cvs_flag[i] may be information specifying whether the bitstream is running on the fixed picture rate. Alternatively, fixed_pic_rate_general_flag[i] or fixed_pic_rate_within_cvs_flag[i] may be information specifying whether the temporal distance between the output times of the consecutive pictures in output order has a fixed value.

FIG. 18 is a view illustrating an image encoding method according to the present disclosure.

The image encoding method of FIG. 18 may be performed by the image encoding apparatus of FIG. 2, for example. Alternatively, the image encoding apparatus may include a memory and at least one processor, and the at least one processor may perform each step of the image encoding method of FIG. 18.

The image encoding apparatus may determine information specifying whether an HRD parameter is present in a bitstream (S1810). general_nal_hrd_params_present_flag and/or general_vcl_hrd_params_present_flag may be information determined in step S1810.

The image encoding apparatus may determine a value of general_nal_hrd_params_present_flag, based on whether a NAL HRD parameter is present in the bitstream (e.g., general_hrd_parameters( ) syntax structure). Specifically, when the NAL HRD parameter is present in the bitstream, the image encoding apparatus may determine general_nal_hrd_params_present_flag to be a first value (e.g., 1), and, otherwise, determine it to be a second value (e.g., 0). general_nal_hrd_params_present_flag may be referred to as a "first flag" in the present disclosure.

Similarly, the image encoding apparatus may determine a value of general_vcl_hrd_params_present_flag, based on whether a VCL HRD parameter is present in the bitstream (e.g., general_hrd_parameters( ) syntax structure). Specifically, when the VCL HRD parameter is present in the bitstream, the image encoding apparatus may determine general_vcl_hrd_params_present_flag to be a first value (e.g., 1), and, otherwise, may determine it to be a second value (e.g., 0). general_vcal_hrd_params_present_flag may be referred to as a "second flag" in the present disclosure.

The image encoding apparatus may determine information specifying whether the bitstream is running on a fixed picture rate (S1820). The information determined in step S1820 may be information specifying whether a temporal distance between output times of consecutive pictures in the bitstream has a fixed value. The above-described fixed_pic_rate_within_cvs_flag may be information determined in step S1820.

The image encoding apparatus may determine a value of fixed_pic_rate_within_cvs_flag[i], based on whether the temporal distance between HRD output times of consecutive pictures in output order in the bitstream has a fixed value when Htid is equal to i. Specifically, when Htid is equal to i, if the temporal distance between HRD output times of consecutive pictures in output order in the bitstream has a fixed value, the image encoding apparatus may determine fixed_pic_rate_within_cvs_flag[i] to be a first value (e.g., 1), and, otherwise, may determine it to be a second value (e.g., 0). fixed_pic_rate_within_cvs_flag[i] may be referred to as a "third flag" in the present disclosure.

However, the information determined in step S1820 is not limited to fixed_pic_rate_within_cvs_flag[i]. For example, the information determined in step S1820 may be fixed_pic_rategeneral_flag[i] or may include both fixed_pic_rate_within_cvs_flag[i] and fixed_pic_rate_general_flag[i].

According to the present disclosure, it is a constraint of bitstream conformance that, when the value of general_nal_hrd_params_present_flag and general_vcl_hrd_params_present_flag are both equal to a second value (e.g., 0), the value of fixed_pic_rate_within_cvs_flag[i] shall be equal to a first value (e.g., 1). In this case, i may be in the range from 0 to maxSublayersMinus1, inclusive.

According to the constraint, when the NAL HRD parameter and the VCL HRD parameter are both not present in the bitstream, by making the temporal distance between HRD output times of consecutive pictures in output order in the bitstream have a fixed value for at least one Htid, signaling of minimum picture timing (fixed picture rate) may be guaranteed.

In order to satisfy the constraint of the bitstream conformance, the image encoding apparatus may determine whether general_nal_hrd_params_present_flag and general_vcl_hrd_params_present_flag are both equal to a second value (e.g., 0). The image encoding apparatus may determine fixed_pic_rate_within_cvs_flag[i] based on the result of determination. That is, when general_nal_hrd_params_present_flag and general_vcl_hrd_params_present_flag are both equal to a second value (e.g., 0), the image encoding apparatus may determine that at least one fixed_pic_rate_within_cvs_flag[i] has a first value (e.g., 1) for i in the range of 0 to maxSublayersMinus1. Accordingly, step S1820 may include step of determining whether general_nal_hrd_params_present_flag and general_vcl_hrd_params_present_flag are both equal to a second value (e.g., 0).

The information determined in step S1810 and the information determined in step S1820 may be encoded in the bitstream and transmitted to an image decoding apparatus. As described below, the image decoding apparatus may obtain the information (general_nal_hrd_params_present_flag, general_vcl_hrd_params_present_flag, fixed_pic_rate_within_cvs_flag[i] and/or fixed_pic_rate_general_flag[i]) from the bitstream. At least one of the information may be used to derive the output times of the pictures in the bitstream and the pictures in the bitstream may be processed (output) based on the derived output times.

fixed_pic_rate_within_cvs_flag[i] (and/or fixed_pic_rate_general_flag[i]) may be signaled for each of the temporal sublayer in the bitstream. In this case, i may be in the range of a variable firstSubLayer specifying a first sublayer and a variable maxSublayers specifying a maximum sublayer. Alternatively, i may be in the range from 0 to maxSublayersMinus1. That is, for each i value, fixed_pic_rate_within_cvs_flag[i] may be signaled, and, when general_nal_hrd_params_present_flag and general_vcl_hrd_params_present_flag are both equal to a second value (e.g., 0), it is constrained that fixed_pic_rate_within_cvs_flag[i] is equal to a first value (e.g., 1) for at least one i.

As described above, general_nal_hrd_params_present_flag and/or general_vcl_hrd_params_present_flag may be encoded in a general HRD parameter syntax structure (e.g., general_hrd_parameters( ) syntax structure), and fixed_pic_rate_within_cvs_flag[i] (and/or fixed_pic_rate_general_flag[i]) may be encoded in an HRD parameter syntax structure (e.g., ols_hrd_parameters( ) syntax structure) for an output layer set.

In the above, the variable maxSublayers specifying the maximum sublayer may be differently determined based on a parameter set in which the HRD parameter syntax structure for the output layer set is encoded. Specifically, when the HRD parameter syntax structure for the output layer set is encoded in the VPS, the value of maxSublayers may be set equal to vps_hrd_max_tid[i]. When the HRD parameter syntax structure for the output layer set is encoded in the SPS, the value of maxSublayers may be set equal to sps_max_sublayers_minus1.

According to the image encoding method of the present disclosure described with reference to FIG. 18, an improved signaling mechanism of timing information capable of signaling simple timing information instead of signaling complex HRD timing information may be provided.

Figure 19:
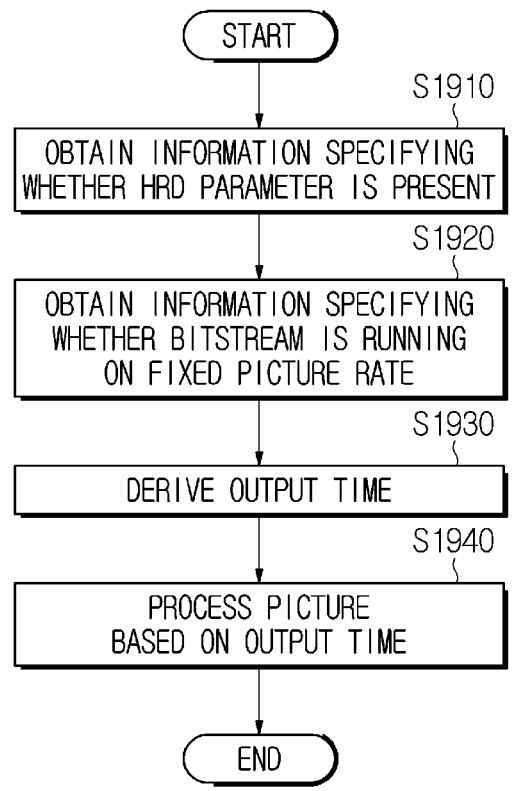
FIG. 19 is a view illustrating an image decoding method according to the present disclosure.

FIG. 19 is a view illustrating an image decoding method according to the present disclosure.

The image decoding method of FIG. 19 may be performed by the image decoding apparatus of FIG. 3, for example. Alternatively, the image decoding apparatus may include a memory and at least one processor, and the at least one processor may perform each step of the image decoding method of FIG. 19.

The image decoding apparatus may obtain information specifying whether an HRD parameter is present in a bitstream (S1910). general_nal_hrd_params_present_flag and/or general_vcl_hrd_params_present_flag may be information obtained in step S1910.

general_nal_hrd_params_present_flag obtained by the image decoding apparatus may specify whether a NAL HRD parameter is present in the bitstream (e.g., general_hrd_parameters( ) syntax structure). Specifically, general_nal_hrd_params_present_flag equal to a first value (e.g., 1) may specify that the NAL HRD parameter is present in the bitstream. In addition, general_nal_hrd_params_present_flag equal to a second value (e.g., 0) may specify that the NAL HRD parameter is not present in the bitstream. general_nal_hrd_params_present_flag may be referred to as a "first flag" in the present disclosure.

Similarly, general_vcl_hrd_params_present_flag obtained by the image decoding apparatus may specify whether a VCL HRD parameter is present in the bitstream (e.g., general_hrd_parameters( ) syntax structure). Specifically, general_vcl_hrd_params_present_flag equal to a first value (e.g., 1) may specify that the VCL HRD parameter is present in the bitstream. In addition, general_vcl_hrd_params_present_flag equal to a second value (e.g., 0) may specify that the VCL HRD parameter is not present in the bitstream. general_vcal_hrd_params_present_flag may be referred to as a "second flag" in the present disclosure.

The image decoding apparatus may obtain information specifying whether the bitstream is running on a fixed picture rate (S1920). The information obtained in step S1920 may be information specifying whether a temporal distance between output times of consecutive pictures in the bitstream has a fixed value. The above-described fixed_pic_rate_within_cvs_flag may be information determined in step S1920.

fixed_pic_rate_within_cvs_flag[i] obtained by the image decoding apparatus may specify whether the temporal distance between HRD output times of consecutive pictures in output order in the bitstream has a fixed value when Htid is equal to i. Specifically, when fixed_pic_rate_within_cvs_flag[i] equal to a first value (e.g., 1) may specify that the temporal distance between HRD output times of consecutive pictures in output order in the bitstream has a fixed value when Htid is equal to i. In addition, fixed_pic_rate_within_cvs_flag[i] equal to a second value (e.g., 0) may specify that temporal distance between HRD output times of consecutive pictures in output order in the bitstream does not have a fixed value. fixed_pic_rate_within_cvs_flag[i] may be referred to as a "third flag" in the present disclosure.

However, the information obtained in step S1920 is not limited to fixed_pic_rate_within_cvs_flag[i]. For example, the information obtained in step S1920 may be fixed_pic_rategeneral_flag[i] or may include both fixed_pic_rate_within_cvs_flag[i] and fixed_pic_rate_general_flag[i].

According to the present disclosure, as described above, it is a requirement of bitstream conformance that, when the value of general_nal_hrd_params_present_flag and general_vcl_hrd_params_present_flag are both equal to a second value (e.g., 0), the value of fixed_pic_rate_within_cvs_flag[i] shall be equal to a first value (e.g., 1). In this case, i may be in the range from 0 to maxSublayersMinus1, inclusive.

According to the requirement, when the NAL HRD parameter and the VCL HRD parameter are both not present in the bitstream, by making the temporal distance between HRD output times of consecutive pictures in the bitstream have a fixed value for at least one Htid, signaling of minimum picture timing (fixed picture rate) may be guaranteed.

Operation of the image encoding apparatus for generating the bitstream satisfying the requirement of the bitstream conformance has been described above. The bitstream received by the image decoding apparatus may satisfy the requirement of the bitstream conformance.

The image decoding apparatus may derive the output times of pictures in the bitstream based on at least one of the information obtained in step S1910 and/or step S1920 (S1930). Thereafter, the image decoding apparatus may process (output) the pictures in the bitstream based on the derived output times.

fixed_pic_rate_within_cvs_flag[i] (and/or fixed_pic_rate_general_flag[i]) may be signaled for each of the temporal sublayer in the bitstream. In this case, i may be in the range of a variable firstSubLayer specifying a first sublayer and a variable maxSublayers specifying a maximum sublayer. Alternatively, i may be in the range from 0 to maxSublayersMinus1. That is, for each i value, fixed_pic_rate_within_cvs_flag[i] may be signaled, and, when general_nal_hrd_params_present_flag and general_vcl_hrd_params_present_flag are both equal to a second value (e.g., 0), it is constrained that fixed_pic_rate_within_cvs_flag[i] is equal to a first value (e.g., 1) for at least one i.

As described above, general_nal_hrd_params_present_flag and/or general_vcl_hrd_params_present_flag may be obtained from a general HRD parameter syntax structure (e.g., general_hrd_parameters( ) syntax structure), and fixed_pic_rate_within_cvs_flag[i] (and/or fixed_pic_rategeneral_flag[i]) may be obtained from an HRD parameter syntax structure (e.g., ols_hrd_parameters( ) syntax structure) for an output layer set.

In the above, the variable maxSublayers specifying the maximum sublayer may be differently determined based on a parameter set from which the HRD parameter syntax structure for the output layer set is obtained. Specifically, when the HRD parameter syntax structure for the output layer set is obtained from the VPS, the value of maxSublayers may be set equal to vps_hrd_max_tid[i]. When the HRD parameter syntax structure for the output layer set is obtained from the SPS, the value of maxSublayers may be set equal to sps_max_sublayers_minus1.

According to the image decoding method of the present disclosure described with reference to FIG. 19, an improved signaling mechanism of timing information capable of receiving simple timing information instead of receiving complex HRD timing information may be provided.

Application Embodiment

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 20:
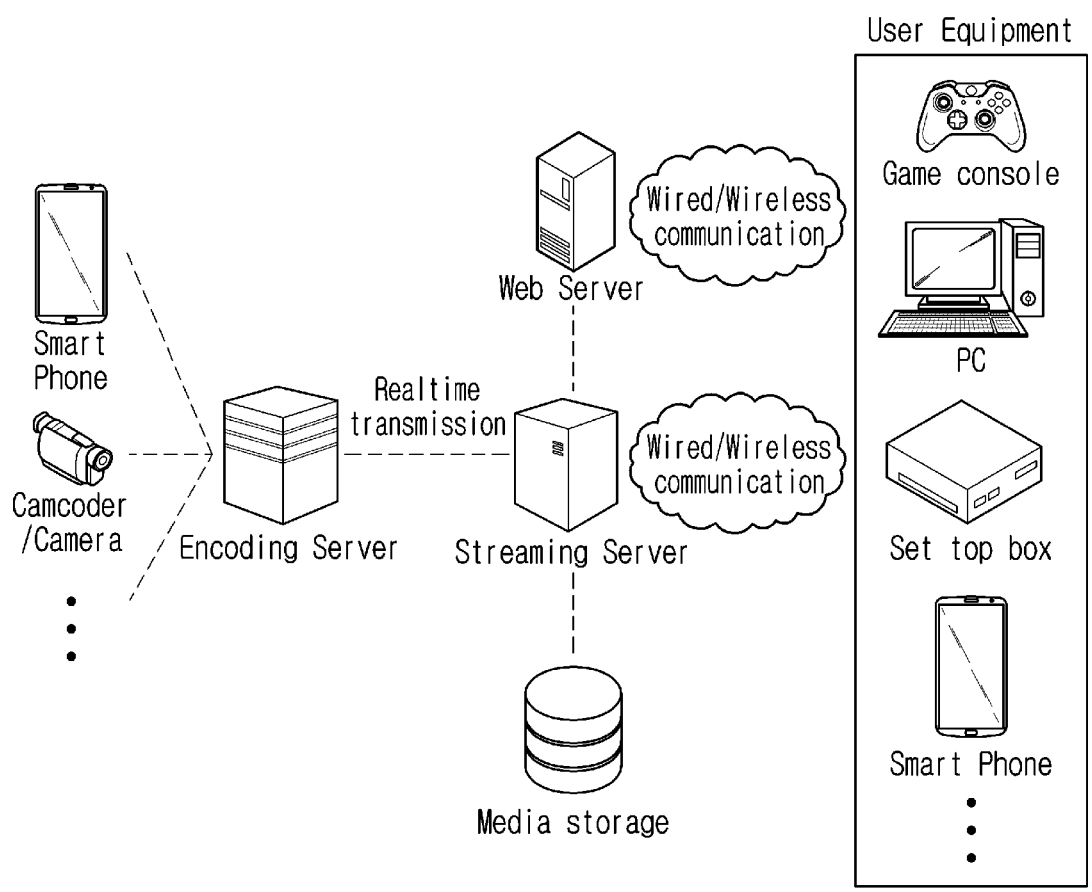
FIG. 20 is a view showing a content streaming system, to which an embodiment of the present disclosure is applicable.

FIG. 20 is a view showing a content streaming system, to which an embodiment of the present disclosure is applicable.

As shown in FIG. 20, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode an image.

What is claimed is:

1. An image decoding method performed by an image decoding apparatus, the image decoding method comprising:
   obtaining a first flag specifying whether a network abstraction layer (NAL) hypothetical reference decoder (HRD) parameter is present in a bitstream and a second flag specifying whether a video coding layer (VCL) HRD parameter is present in the bitstream;
   obtaining a third flag specifying whether a temporal distance between output times of consecutive pictures in the bitstream has a fixed value;
   deriving output times of the pictures in the bitstream, based on at least one of the first flag, the second flag or the third flag; and
   processing the pictures in the bitstream based on the derived output times,
   wherein, based on the first flag having a second value specifying that the NAL HRD parameter is not present in the bitstream and the second flag having a second value specifying that the VCL HRD parameter is not present in the bitstream, it is constrained that the third flag has a first value specifying that the temporal distance between the output times of the consecutive pictures in the bitstream has the fixed value.

2. The image decoding method of claim 1,
   wherein the third flag is obtained for each of temporal sublayers in the bitstream, and
   wherein, based on the first flag having the second value and the second flag having the second value, it is constrained that the third flag for at least one of the temporal sublayers in the bitstream has the first value.

3. The image decoding method of claim 1,
   wherein the third flag is obtained in a plurality by a maximum number of temporal sublayers in the bitstream, and
   wherein, based on the first flag having the second value and the second flag having the second value, at least one of the obtained third flags has the first value.

4. The image decoding method of claim 3, wherein the first flag and the second flag are obtained from a general HRD parameter syntax structure in the bitstream, and the third flag is obtained from an HRD parameter syntax structure for an output layer set.

5. The image decoding method of claim 4, wherein a maximum number of temporal sublayers is differently determined based on a parameter set from which an HRD parameter syntax structure for the output layer set is obtained.

6. An image encoding method performed by an image encoding apparatus, the image encoding method comprising:
   determining a first flag specifying whether a network abstraction layer (NAL) hypothetical reference decoder (HRD) parameter is present in a bitstream and a second flag specifying whether a video coding layer (VCL) HRD parameter is present in the bitstream; and
   determining a third flag specifying whether a temporal distance between output times of consecutive pictures in the bitstream has a fixed value,
   wherein output times of pictures in the bitstream are derived based on at least one of the first flag, the second flag or the third flag,
   wherein the pictures in the bitstream are processed based on the derived output times,
   wherein, based on the first flag having a second value specifying that the NAL HRD parameter is not present in the bitstream and the second flag having a second value specifying that the VCL HRD parameter is not present in the bitstream, it is constrained that the third flag has a first value specifying that the temporal distance between the output times of the consecutive pictures in the bitstream has the fixed value.

7. The image encoding method of claim 6,
   wherein the third flag is determined for each of temporal sublayers in the bitstream, and
   wherein, based on the first flag having the second value and the second flag having the second value, it is constrained that the third flag for at least one of the temporal sublayers in the bitstream has the first value.

8. The image encoding method of claim 6,
   wherein the third flag is determined in a plurality by a maximum number of temporal sublayers in the bitstream, and
   wherein, based on the first flag having the second value and the second flag having the second value, at least one of the determined third flags has the first value.

9. The image encoding method of claim 8, wherein the first flag and the second flag are encoded in a general HRD parameter syntax structure in the bitstream, and the third flag is encoded in an HRD parameter syntax structure for an output layer set.

10. The image encoding method of claim 9, wherein a maximum number of temporal sublayers is differently determined based on a parameter set in which an HRD parameter syntax structure for the output layer set is encoded.

11. A method of transmitting a bitstream generated by an image encoding method, the image encoding method comprising:
    determining a first flag specifying whether a network abstraction layer (NAL) hypothetical reference decoder (HRD) parameter is present in a bitstream and a second flag specifying whether a video coding layer (VCL) HRD parameter is present in the bitstream; and
    determining a third flag specifying whether a temporal distance between output times of consecutive pictures in the bitstream has a fixed value,
    wherein output times of pictures in the bitstream are derived based on at least one of the first flag, the second flag or the third flag, wherein the pictures in the bitstream are processed based on the derived output times, wherein, based on the first flag having a second value specifying that the NAL HRD parameter is not present in the bitstream and the second flag having a second value specifying that the VCL HRD parameter is not present in the bitstream, it is constrained that the third flag has a first value specifying that the temporal distance between the output times of the consecutive pictures in the bitstream has the fixed value.

* * * * *